(12) United States Patent
Rootsey et al.

(10) Patent No.: US 11,245,187 B2
(45) Date of Patent: Feb. 8, 2022

(54) MINIATURIZED SHORTWAVE ANTENNA CLUSTER SYSTEM FOR COMPACT MULTI-BAND TRANSMISSION AND RECEPTION AND ASSOCIATED METHODS

(71) Applicant: HYSKY TECHNOLOGIES, INC., Savannah, GA (US)

(72) Inventors: James V. Rootsey, Melbourne, FL (US); Paul Smith-Goodson, Cedar Park, TX (US); Charles C. Maynard, Savannah, GA (US)

(73) Assignee: HYSKY TECHNOLOGIES, INC., Savannah, GA (US)

( * ) Notice: Subject to any disclaimer, the term of this patent is extended or adjusted under 35 U.S.C. 154(b) by 290 days.

(21) Appl. No.: 16/736,981

(22) Filed: Jan. 8, 2020

(65) Prior Publication Data
US 2020/0227828 A1 Jul. 16, 2020

Related U.S. Application Data

(60) Provisional application No. 62/791,071, filed on Jan. 11, 2019.

(51) Int. Cl.
*H01Q 1/28* (2006.01)
*H01Q 5/307* (2015.01)
*H04B 7/08* (2006.01)
*H04B 7/06* (2006.01)

(52) U.S. Cl.
CPC .............. *H01Q 5/307* (2015.01); *H01Q 1/288* (2013.01); *H04B 7/0691* (2013.01); *H04B 7/0874* (2013.01)

(58) Field of Classification Search
CPC .......... H01Q 1/288; H01Q 5/307; H01Q 9/32; H04B 7/0691; H04B 7/0874
See application file for complete search history.

(56) References Cited

U.S. PATENT DOCUMENTS

| 7,889,143 B2 * | 2/2011 | Milosavljevic | H01Q 9/0421 343/722 |
| 2011/0175791 A1 * | 7/2011 | Ozdemir | H01Q 21/245 343/876 |

* cited by examiner

*Primary Examiner* — Daniel Munoz
(74) *Attorney, Agent, or Firm* — Womble Bond Dickinson (US) LLP

(57) ABSTRACT

The present disclosure includes an embodiment of a miniaturized antenna system and methods for compact multi-band transmission and reception of radio signals in a high-frequency (HF) band. An embodiment of the antenna system may include a plurality of shortwave antennas arranged in an antenna cluster, one or more controllers, and one or more monitors. The embodiment of the antenna system may allow the antenna cluster to operate effectively without a plurality of switches over a plurality of HF band frequencies. An embodiment of the one or more controllers may include a frequency testing and acknowledgement circuit that may determine and confirm which frequencies are propagating. In an embodiment, the methods of operating the antenna system may include determining selected frequencies, selecting a shortwave antenna, switching between a transmitter and a receiver, transmitting a radio signal, receiving acknowledgement signals and configuring the antenna system in response to receiving the acknowledgement signals.

20 Claims, 19 Drawing Sheets

| Frequency, f (MHz) | Speed of light, v (m/s) | Wavelength, λ (m) | Half-Wavelength, λ/2 (m) | Half-Wavelength, λ/2 (in.) | Approximate Antenna Length, L L=λ/2 *N Where (N=1/100) for all frequencies (in.) |
|---|---|---|---|---|---|
| 4X10⁶ | 3X10⁸ | 75 | 37.5 | 1476.38 | 14 |
| 7X10⁶ | 3X10⁸ | 42.86 | 21.43 | 843.64 | 9 |
| 10X10⁶ | 3X10⁸ | 30 | 15 | 590.55 | 6 |
| 14X10⁶ | 3X10⁸ | 21.43 | 10.71 | 421.82 | 5 |
| 20X10⁶ | 3X10⁸ | 15 | 7.5 | 295.28 | 3 |

| Frequency, f (MHz) | Speed of light, v (m/s) | Wavelength, λ (m) | Half-Wavelength, λ/2 (m) | Half-Wavelength, λ/2 (in.) | Approximate Antenna Length, L L=λ/2 *N Where (N=1/100,1/60,1/40,1/30,1/20) for each frequency in increasing order, respectively (in.) |
|---|---|---|---|---|---|
| 4X10⁶ | 3X10⁸ | 75 | 37.5 | 1476.38 | 14 |
| 7X10⁶ | 3X10⁸ | 42.86 | 21.43 | 843.84 | 14 |
| 10X10⁶ | 3X10⁸ | 30 | 15 | 590.55 | 14 |
| 14X10⁶ | 3X10⁸ | 21.43 | 10.71 | 421.82 | 14 |
| 20X10⁶ | 3X10⁸ | 15 | 7.5 | 295.28 | 14 |

| Time | Frequency |
|------|-----------|
| T1 | F1 |
| T2 | F2 |
| ... | ... |
| Tn | Fn |

MINIATURIZED SHORTWAVE ANTENNA CLUSTER SYSTEM FOR COMPACT MULTI-BAND TRANSMISSION AND RECEPTION AND ASSOCIATED METHODS

RELATED APPLICATION

The present application is a non-provisional application which claims priority to, and the benefit of U.S. Provisional Application No. 62/791,071, titled "MINIATURIZED SHORTWAVE ANTENNA CLUSTER SYSTEM FOR COMPACT MULTI-BAND TRANSMISSION AND RECEPTION AND ASSOCIATED METHODS," filed Jan. 11, 2019, which is incorporated herein by reference in its entirety.

FIELD OF INVENTION

The present disclosure relates generally to the field of radio transmission and reception. More specifically, the present disclosure relates to miniature short wave antenna cluster systems and related methods which may be used for multi-band transmission and reception for long-wavelength low-power signals such as within high-frequency (HF) bands.

BACKGROUND

The propagation of radio waves through the Earth's ionospheric region (typically between 75 and 800 kilometers (km) above the Earth's surface) enables the radio waves to travel over a much larger distance than would be possible with line-of-sight. This mode of propagation allows high-frequency (HF) band or shortwave band to travel worldwide. The HF band typically ranges between 3 to 30 Megahertz (MHZ), equivalent to 100 (m) meters and 10 (m) meters in wavelength, respectively. Over the past few decades, the HF band has been a primary choice over satellites or cellular networks because of its ability to transmit short messages more reliably and consistently over greater distances.

The ionospheric region has several layers capable of reflecting and absorbing radio waves at certain frequencies. The degree of reflection and absorption relies on many factors including the frequency of the radio waves. Each layer behaves differently towards certain frequencies. In addition, the characteristics of each layer within the ionospheric region change with the time of day (diurnal cycle), season, locations, and solar cycle, among other factors. Thus, the constantly shifting characteristics of the ionospheric region present a technical challenge to achieve an uninterrupted, reliable, and successful HF band propagation.

Selecting appropriate frequencies for a specific time and application to ensure a reliable HF band propagation through the ionospheric region also presents a technical problem to a communication device including antenna size and antenna capability to concurrently accommodate multiple frequency bands.

Recently, extremely small antenna design has received growing attention for use in various wireless systems. The size of the antenna may impact its performance. Antenna size is largely determined by its associated operating frequency. A lower operating frequency yields a longer wavelength, and it requires a longer antenna to operate. Similarly, a higher operating frequency yields a shorter wavelength, and it, in turn, requires a shorter antenna to operate. Because the wavelength for HF band varies from about 10 meters (m) at an operating frequency of 30 MHz to 100 meters (m) at an operating frequency of 3 MHz, a user requires efficient one-quarter wavelength monopole antennas of great lengths or extremely complex tuning methods to accommodate the range of frequencies assigned by the regulatory bodies including the Federal Communications Commission (FCC) or International Telecommunication Union (ITU). The FCC or ITU might grant a license to a user that includes five or six frequencies over which to transmit.

Thus, Applicants have recognized that whether at sea or on land, the selected antenna size often needs to be multiple meters in length, and the associated tuning circuitry requires greater power, time, and space to operate efficiently. In contrast, current antenna system development emphasizes on a reduction of size, weight, and power (SWaP).

Therefore, Applicants have recognized that there is a need for an antenna system that is extremely small and capable of acting as a compact multi-band transmitter and receiver for a reliable HF band propagation.

SUMMARY

Applicants recognized the problems noted above herein and conceived and developed embodiments of a miniaturized shortwave antenna system and associated methods, according to the present disclosure, for compact multi-band transmission and reception of HF band.

An embodiment of an antenna system described herein, for example, may be directed to create a miniaturized shortwave antenna system arranged in a cluster and capable of transmitting and receiving multiple-frequencies in the HF band within a relatively small and limited space. Such an embodiment of an antenna system according to this disclosure may not require electrically tall monopole antennas, a large area upon which to mount the antennas, or complex circuitry for switching or tuning. There are varieties of wireless system applications where a space to integrate the antenna system is limited. Embodiments of applications of a system and associated methods according to the disclosure may include, for example, land mobile radio system, fixed remote, shipboard communications, compact handheld devices, tablets, military equipment, and others.

According to an embodiment of a system of the present disclosure, with careful selection of size, dielectric core dimensions, and inductance, the antenna system also may be capable of effectively and selectively rejecting other bands assigned to the user by the FCC or ITU. The present disclosure further provides embodiments of an antenna system that may change frequencies virtually and instantly from one assigned frequency to the next without changing antenna connections. Such an embodiment of a system, for example, may eliminate the requirement of an extensive network of switchable tuning circuit components and time delay.

In one disclosed embodiment, a miniaturized antenna system for compact multi-band transmission and reception of high-frequency (HF) band may include a plurality of shortwave antennas positioned and arranged in one or more antenna clusters. Each of the plurality of the shortwave antennas may have a different length dimension as a function of one or more HF operating frequencies in a HF band. Additionally, each of the plurality of the shortwave antennas may have substantially similar dielectric core dimensions. The one or more antenna clusters, in turn, may be positioned to communicate radio signals at the one or more HF operating frequencies in the HF band.

According to an embodiment of the present disclosure, the system may also include a common platform connected to the one or more antenna clusters. The plurality of shortwave antennas may be positioned spaced apart from each of the other ones of the plurality of shortwave antennas. The positioning of the plurality of shortwave antennas may form one or more selected antenna cluster arrangements on the common platform.

The system may further include one or more shortwave antenna controllers connected to the one or more antenna clusters to selectively control the one or more antenna clusters when connected to either one or more HF transmitters, one or more HF receivers, or both.

In one disclosed embodiment, the system may further include one or more monitors responsive to the one or more shortwave antenna controllers to monitor operational characteristics of the one or more antenna clusters.

An embodiment of the antenna system may include a plurality of antennas with different length dimension. The different length dimension of each of the plurality of the shortwave antennas may be a fraction of a wavelength of a selected HF operating frequency of the one or more HF operating frequencies. The wavelength may be determined by the one or more operating frequencies in the HF band.

According to an embodiment of the present disclosure, the selected length of each of the plurality of shortwave antennas may be 1/100 of a wavelength. In one embodiment, the wavelength may be determined by the one or more operating frequencies in the HF band. A different constant may be used to calculate the dimension length.

According to an embodiment of the present disclosure, each of the plurality of shortwave antennas, positioned in each of the one or more antenna clusters, for example, may also be connected to the one or more HF transmitters or the one or more HF receivers via a common switched cable. The common switched cable may be configured simultaneously to couple each of the one or more shortwave antennas positioned in each of the one or more antenna clusters to the one or more HF transmitters. In addition, the common switched cable may be also configured simultaneously to couple each of the one or more shortwave antennas positioned in each of the one or more antenna clusters to the one or more HF receivers.

In one disclosed embodiment, each of the plurality of shortwave antennas, positioned in each of the one or more antenna clusters may emit one or more antenna beams at the one or more HF operating frequencies. The one or more antenna beams, for example, may include a plurality of omnidirectional antenna beams for transmitting and receiving radio signals at the one or more HF operating frequencies in the HF band. The one or more antenna beams may allow the one or more antenna clusters to communicate radio signals at the one or more HF operating frequencies in the HF band.

In one embodiment, each of the plurality of shortwave antennas, positioned in each of the one or more antenna cluster may transmit the radio signals at the one or more selected frequencies in the HF band to one or more distant base stations at selected distant locations without use of a separate power source.

In a further disclosed embodiment, each of the plurality of the shortwave antennas may be positioned in each of the one or more antenna clusters may have selected different length dimensions, and substantially similar dielectric core dimensions, and inductances configured to reject radio signals in frequency bands outside of the selected one or more operating frequencies in the HF band.

Disclosed embodiments of the one or more shortwave antenna controllers connected to the one or more antenna clusters may include a frequency testing and acknowledgement circuit. The frequency testing and acknowledgement circuit may be configured to determine and confirm which the one or more HF operating frequencies in the HF band are propagating to and from selected distant locations.

The embodiment of the miniaturized antenna system for compact multi-band transmission and reception of high-frequency (HF) band may further include a plurality of shortwave antennas positioned and arranged in one or more antenna clusters. The one or more antenna clusters may also be positioned to communicate radio signals at the one or more HF operating frequencies in the HF band. Each of the plurality of the shortwave antennas may have a same length dimension proportional to each of one or more HF operating frequencies in a HF band and substantially different dielectric core dimensions.

In another embodiment of a system of the present disclosure, each of the plurality of the shortwave antennas positioned in each of the one or more antenna clusters may have selected same length dimensions, substantially different dielectric core dimensions, and inductances configured to reject radio signals in frequency bands outside of the selected one or more operating frequencies in the HF band.

The embodiment of the miniaturized antenna system may further include one or more transceiver units connected to the one or more antenna clusters and positioned away from one or more base stations to communicate with the one or more base stations. The one or more transceiver units may have internal memory to store one or more pairs of propagating radio signal frequencies and associated times of a day, thereby allowing the one or more transceiver units to rapidly switch between a plurality of frequency bands and eliminating the time to change the one or more shortwave antennas or retune the one or more shortwave antennas.

An embodiment of the one or more pairs of propagating radio signal frequencies and associated times of a day may be periodically updated by the one or more base stations.

In another disclosed embodiment, the one or more transceiver units may have freedom to rapidly step between the plurality of frequency bands to acquire one or more new communication links in an event of unsuccessful propagation of one or more radio signal frequencies to the one or more base stations.

In one disclosed embodiment, the one or more transceiver units may have freedom to rapidly step between the plurality of frequency bands to acquire a new communication link in an event of one or more acknowledgements are not received by the one or more transceiver units.

In yet another disclosed embodiment, a method of operating a compact multi-band high-frequency (HF) antenna system for connection with one or more distant base stations, the antenna system may include a plurality of shortwave antennas disposed on a common platform. The plurality of shortwave antennas may be configurable for transmission and reception of radio signals in HF band and may also support communications in multiple frequency bands in the HF band. According to an embodiment of the present disclosure, the method of operating a compact multi-band high-frequency (HF) antenna system may include determining, by one or more shortwave antenna controllers, one or more selected frequencies of the radio signals to be transmitted.

In one embodiment, the method of operating a compact multi-band high-frequency (HF) antenna system may further include selecting one or more shortwave antennas from the plurality of shortwave antennas. Each shortwave antenna may have selected lengths, dielectric core dimensions, and inductances. Each of the one or more shortwave antennas may also be tuned to one or more operating frequencies in the HF band. Each of the selected one or more shortwave antennas may be positioned to emit one or more antenna beams to communicate radio signals at the one or more operating frequencies in the HF band.

In another disclosed embodiment, a method of operating a compact multi-band high-frequency (HF) antenna system may further include selectively switching between one or more HF transmitters and one or more HF receivers. The antenna system, for example, may be positioned in transmit mode when the one or more shortwave antennas are connected to the one or more HF transmitters. Alternatively, the antenna system may be positioned in receive mode when the one or more shortwave antennas are connected to the one or more HF receivers.

In a further disclosed embodiment, a method of operating a compact multi-band high-frequency (HF) antenna system may further include transmitting the radio signals at the one or more selected frequencies in the HF band through the one or more selected shortwave antennas to the one or more distant base stations at selected distant locations.

The method may further include receiving one or more acknowledgement signals, by the one or more shortwave antenna controllers, to indicate a successful transmission of the transmitted radio signals. The method may also include configuring the antenna, responsive to the receiving, to communicate subsequent radio signals.

In one embodiment, the selected length of each of the plurality of shortwave antennas may include a different length dimension as a function of the one or more operating frequencies in the HF band and substantially similar dielectric core dimensions.

Embodiments of the present disclosure, for example, may provide one or more of: (1) a reliable passive link to a data communication system that enables data to be transmitted and received from very remote or highly mobile sources at significantly reduced costs and in significantly reduced space; (2) an accommodating and simplified two-way data communications link both to and from remote field, mobile, or shipboard units where a significantly reduced visual and physical profile is desired; (3) an ubiquitous coverage over a wide geographic area, while requiring significantly reduced capital expenditures for antennas and related circuitry; (4), a consistency with communication systems that make use of simple and economical field devices, costing far less than, for example, a comparable geostationary satellite data terminal; (5) no necessity to require direct line of sight with a base station unit for communications to be successful and reliable; (6) compatibility with remote units that operate on battery power, eliminating a need for extra circuitry or switches that demand energy; and (7) substantially reduced costs for a customer, making it less than traditional antennas for existing cellular, and satellite systems.

BRIEF DESCRIPTION OF DRAWINGS

The foregoing aspects, features, and advantages of the present disclosure will be further appreciated when considered with reference to the following drawings.

DETAILED DESCRIPTION OF THE DISCLOSURE

The foregoing aspects, features, and advantages of the present disclosure will be further appreciated when considered with reference to the following description of the following embodiments and accompanying drawings. In describing the following embodiments of the disclosure illustrated in the appended drawings, specific terminology will be used for the sake of clarity. The disclosure, however, is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present disclosure are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Figure 1:
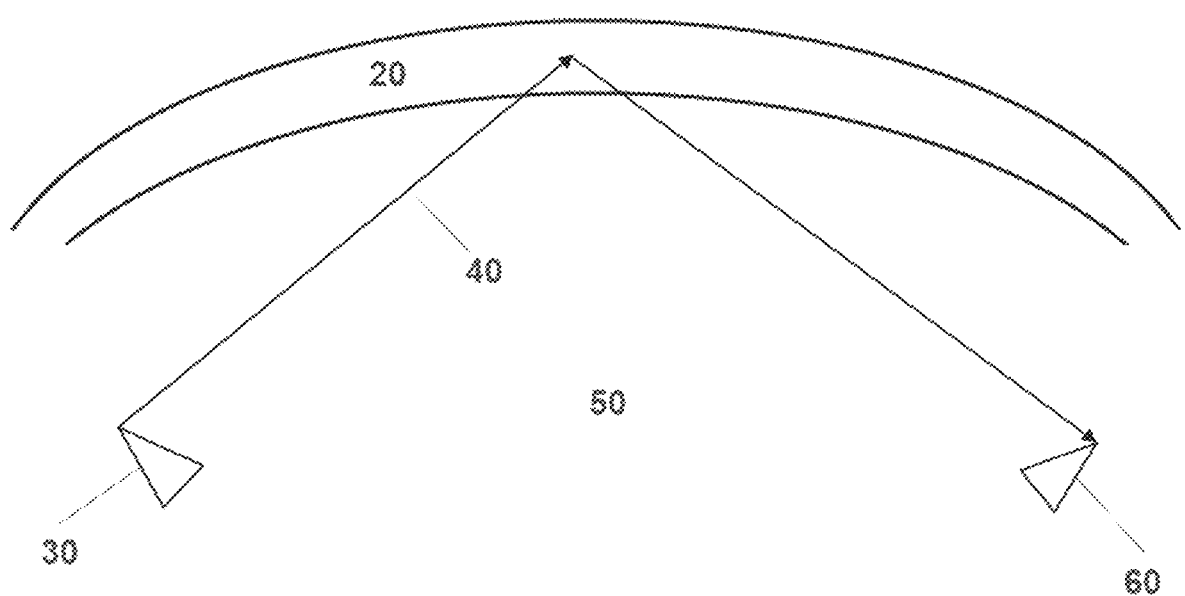
FIG. 1 is a schematic drawing illustrating radio wave propagation through the ionospheric region according to an embodiment of the present disclosure.

The propagation of radio waves 40 through the Earth's ionospheric region 20 (typically between 75 and 800 km above the Earth's surface 50) enables high-frequency (HF) band or shortwave band to travel worldwide, such as shown in FIG. 1. The constantly shifting characteristics of the ionospheric region present a technical challenge to achieve a reliable HF-band propagation.

An embodiment of a miniaturized antenna cluster system as described herein may be used for compact multi-band transmission and reception of HF band to improve the existing transmission and reception such that assigned HF frequencies are made available rapidly and efficiently in response to variations in the ionospheric region 20 in order to achieve more reliable communications between a transmitter 30 and a receiver 60 as illustrated in FIG. 1.

According to an embodiment of the present disclosure, the system also may eliminate inefficiencies and delays normally embedded in a frequency selection process. Specifically, a small antenna relative to a wavelength is usually required to be reconfigured or retuned before a communication in a different HF radio band can begin.

Figure 2A:
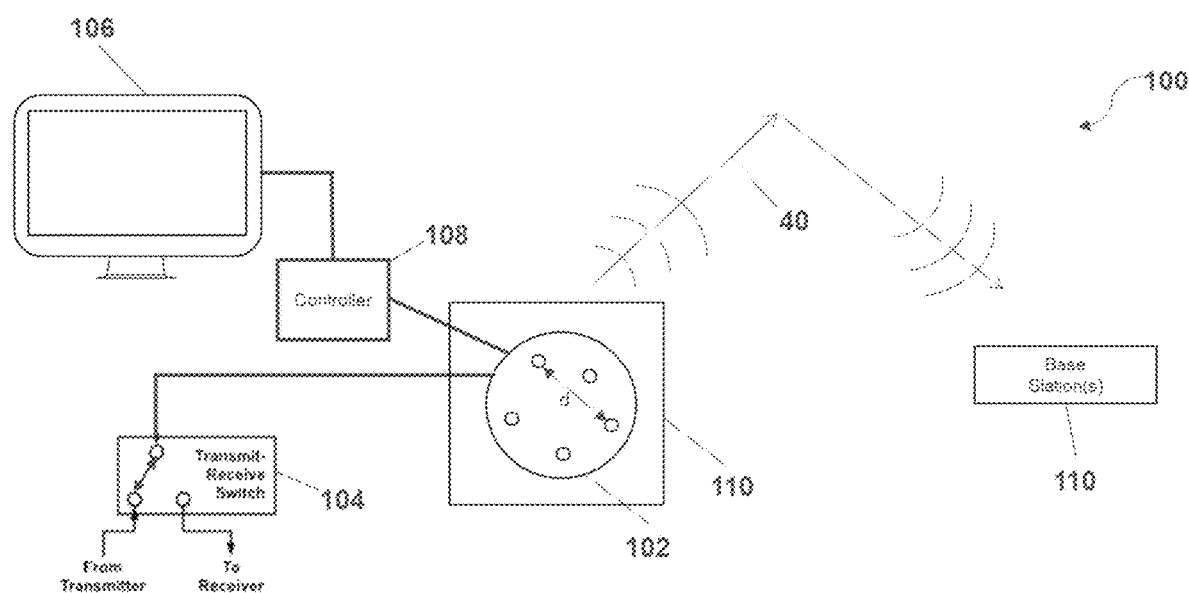
FIG. 2A is a schematic diagram illustrating the antenna system in a transmitting mode according to an embodiment of the present disclosure.
Figure 2B:
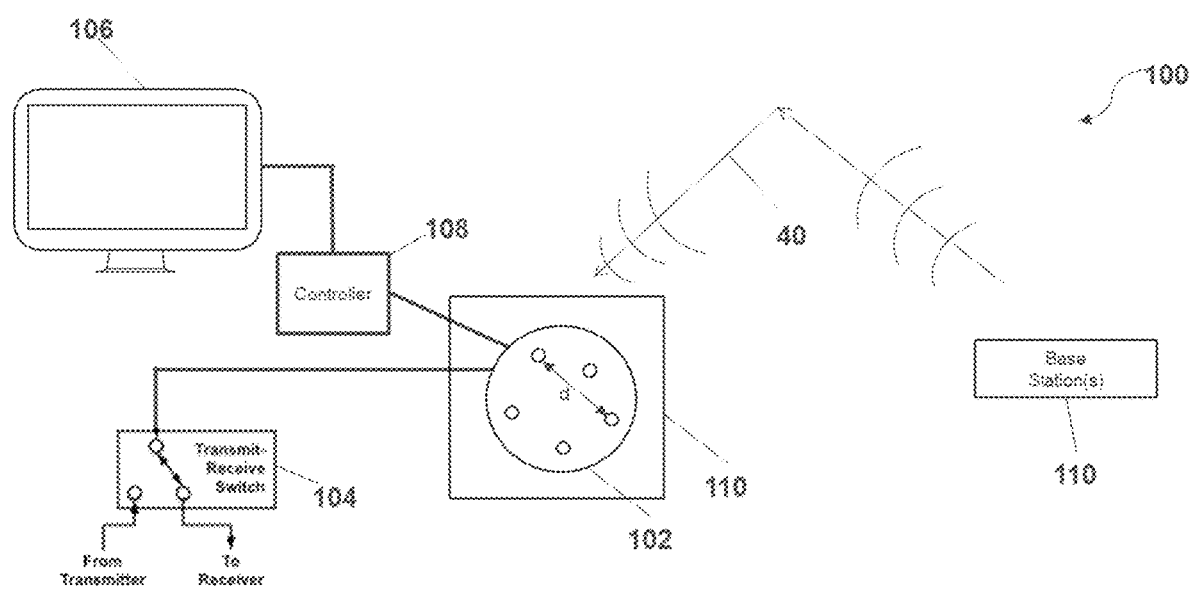
FIG. 2B is a schematic diagram illustrating the antenna system in a receiving mode according to an embodiment of the present disclosure.
Figure 3:
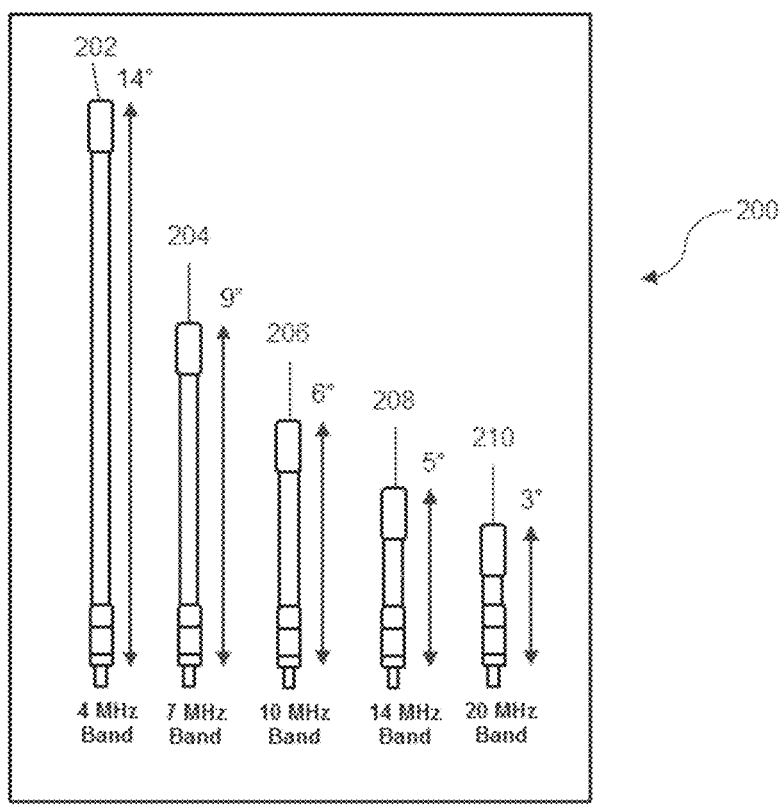
FIG. 3 is a schematic drawing illustrating a cluster of very small shortwave radio monopole antennas (about 1/100 of a wavelength each) according to an embodiment of the present disclosure.

According to an embodiment of the present disclosure, a miniaturized antenna system 100 for compact multi-band transmission and reception of high-frequency (HF) band may include a plurality of shortwave antennas positioned together and arranged in one or more antenna clusters 102 as shown in FIGS. 2A and 2B. An embodiment of a miniaturized antenna cluster system 100 may further include a common platform 110 connected to the one or more antenna clusters 102 as shown in FIGS. 2A and 2B. In one embodiment, the plurality of shortwave antennas may be positioned spaced apart from each of the other ones of the plurality of shortwave antennas thereby forming one or more selected antenna cluster arrangements on the common platform 110. According to an embodiment, the one or more clusters 102 may be connected to the common platform 110 to communicate radio signals at the one or more frequencies in the HF band to one or more base stations 110 at selected distant locations. As illustrated in FIG. 3, each of the plurality of the antennas 202, 204, 206, 208, and 210 may have a different length dimension as a function of each of one or more frequencies in a HF band. In one embodiment, antenna 202 operating in 4 MHz frequency band may have a length of 14 inches, antenna 204 operating in 7 MHz frequency band may have a length of 9 inches, antenna 206 operating in 10 MHz frequency band may have a length of 6 inches, antenna 208 operating in 14 MHz frequency band may have a length of 5 inches, and antenna 210 operating in 20 MHz frequency band may have a length of 3 inches. In addition, each of the plurality of the antennas 202, 204, 206, 208, and 210 may have substantially similar dielectric core dimensions.

In one embodiment, the one or more antenna clusters 102 may also be positioned to communicate radio signals at the one or more HF operating frequencies in the HF band.

Shown in FIG. 2A, the system 100 may also include one or more shortwave antenna controllers 108 connected to the one or more antenna clusters 102 to control the one or more clusters 102 when connected to either one or more HF transmitters, one or more HF receivers, or both. The system may further include one or more monitors 106 responsive to the one or more shortwave antenna controllers 108 to monitor operational characteristics of the one or more antenna clusters as illustrated in FIGS. 2A and 2B. Unlike antennas used for cell and satellite operations that often require power to efficiently gather and forward signals, each of the plurality of shortwave antennas positioned in each of the one or more antenna clusters 102 may transmit radio signals at the one or more selected frequencies in the HF band to the one or more base stations 110 at selected distant locations without the use of a separate power source.

According to another embodiment of the present disclosure, the antenna system 100 may transmit radio signals to a base station 110 when the antenna system 100 is in a transmit mode as illustrated in FIG. 2A. Another embodiment of the present disclosure shows the antenna system 100 may receive radio signals from a base station 110 when the antenna system 100 is in a receive mode as shown in FIG. 2B.

According to an embodiment of the present disclosure, a length dimension of each of a plurality of the shortwave antennas may depend on a wavelength of the operating frequency. Further, each of the plurality of the shortwave antennas may have a length dimension of a fraction of a wavelength of the operating frequency.

In one embodiment, the different length dimension of each of the plurality of the shortwave antennas may be a fraction of a wavelength of a selected HF operating frequency of the one or more HF operating frequencies.

Figure 4:
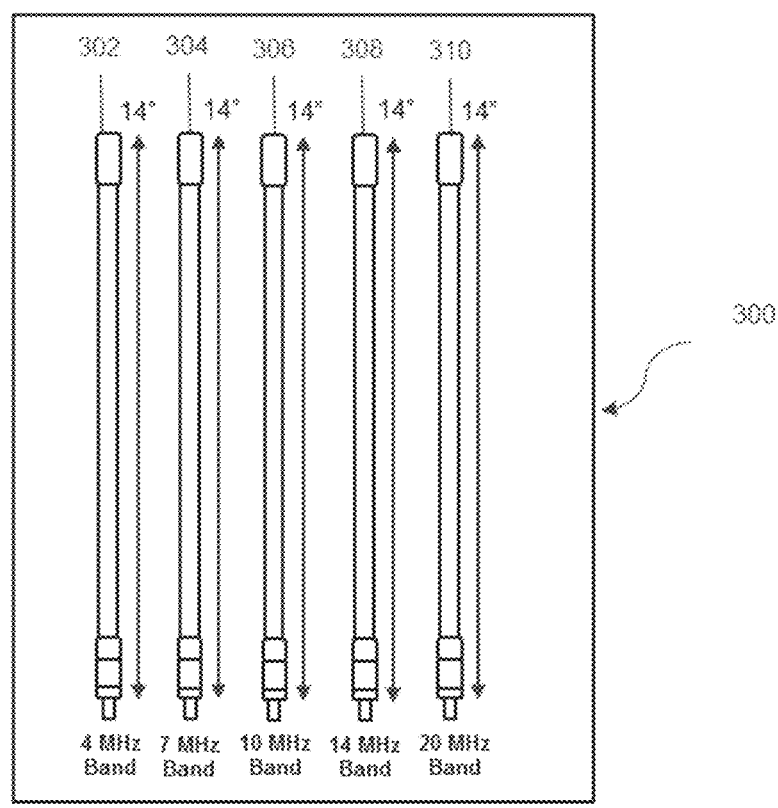
FIG. 4 is a schematic drawing illustrating a cluster of very small shortwave radio monopole antennas (about 1/100 of a wavelength at 4 MHz, varying in length to about 1/20 of a wavelength at 4 MHz) according to an embodiment of the present disclosure.

According to another embodiment of the present disclosure, the system 100 may include a plurality of shortwave antennas connected together and arranged in one or more clusters 200 and 300, as shown in FIGS. 3 and 4 of the drawings, respectively. As illustrated in FIG. 3, 200 is a cluster of five very small shortwave radio monopole antennas 202, 204, 206, 208, and 210 (about 1/100 of a wavelength each), in accordance with example embodiments of the present disclosure.

According to an embodiment of the present disclosure, each antenna in the one or more clusters may tune to its respective frequency bands (for example 4 MHz, 7 MHz, 10 MHz, 14 MHz, and 20 MHz) as allocated by the FCC or ITU. The wavelength of each antenna operating frequency in the one or more clusters may be calculated according to the following formula, $$v = f\lambda. \quad \text{Formula (1)}$$

Wherein v is the speed of light in m/s, f is the operating frequency of each antenna in Hz, and $\lambda$ is the wavelength of the operating frequency of each antenna in meters (m).

The half-wavelength in meters (m) is according to the following formula, $$\lambda_{1/2} = \lambda/2 \quad \text{Formula (2)}$$

Wherein $\lambda_{1/2}$ is the half-wavelength in meters (m), and $\lambda$ is the wavelength of the operating frequency of each antenna in meters.

The half-wavelength in meters (m) is converted to inches according to the following formula, $$\lambda_{1/2} = 39.37 * \lambda_{1/2} \quad \text{Formula (3)}$$

Wherein $\lambda_{1/2}$ is the half-wavelength in inches.

The length of each antenna operating frequency in the one or more clusters is calculated according to the following formula, $$L = \lambda_{1/2} * N \quad \text{Formula (4)}$$

Wherein L the approximate length of each antenna in the one or more clusters, $\lambda_{1/2}$ is half-wavelength of each antenna in meters (m), and N is the multiplier for each of the antenna length.

Figure 6:
FIG. 6 is a table illustrating the length (L) of each antenna shown in FIG. 3 calculated according to Formula (4) according to an embodiment of the present disclosure.

The length (L) of each antenna calculated according to Formula (4) is shown in FIG. 6. FIG. 6 may include a table 500 showing the wavelength, half-wave, length, and antenna length for each antenna in various frequency bands. The frequency band may include 4 MHz, 7 MHz, 10 MHz, 14 MHz, and 20 MHz. The length of each of the shortwave antennas may be different from each other depending on the frequency band that the antenna may be operating. For example, the length of an antenna operating in an operating frequency of 4 MHz may be 14 inches while the length of an antenna operating in an operating frequency of 20 MHz may be 3 inches as illustrated in table 500 in FIG. 6.

A different frequency assignment may include different HF bands. According to another embodiment of the present disclosure, the number of shortwave radio monopole antennas in the cluster and the number of frequency bands may vary.

Figure 8:
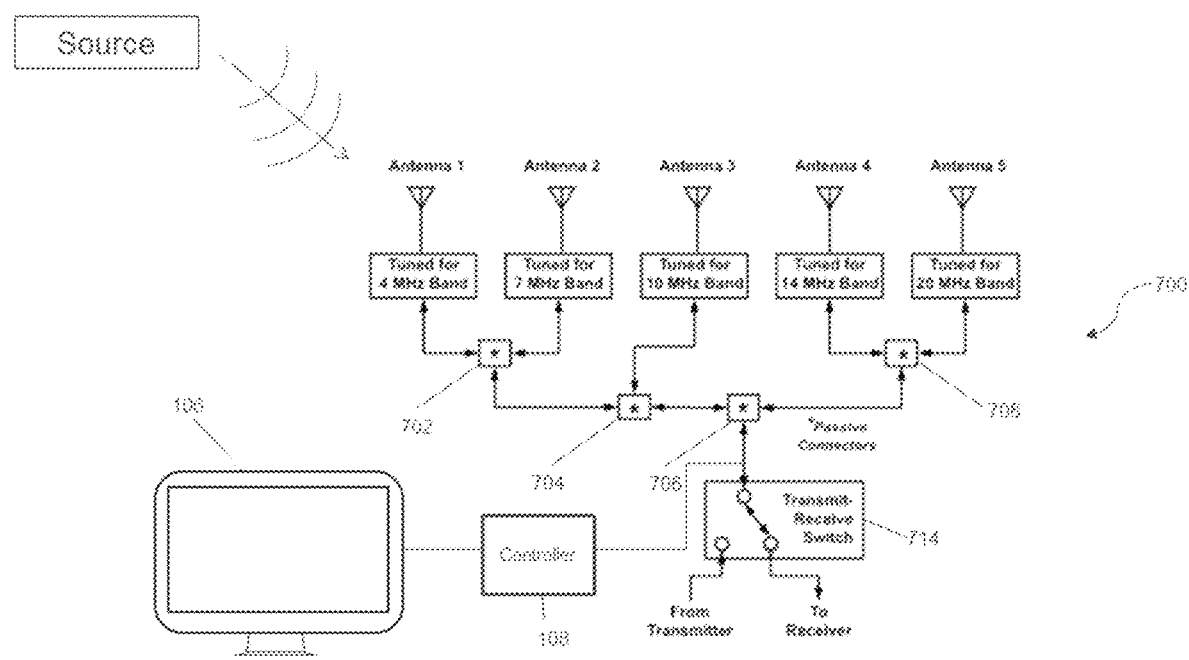
FIG. 8 is a block diagram illustrating exemplary of how a shortwave antenna cluster might be connected to a transmitter and receiver through passive connectors (without switches or tuning elements) according to an embodiment of the present disclosure.

According to an embodiment of the present disclosure, a plurality of shortwave antennas in each of the one or more antenna clusters 200 or 300 may be operable without a plurality of switches over a plurality of HF band frequencies. According to another embodiment of the present disclosure, each of the plurality of shortwave antennas, positioned in each of the one or more antenna clusters, may be also connected to the one or more HF transmitters or the one or more HF receivers via a common switched cable as shown in FIG. 8.

In one embodiment, the common switched cable may be configured simultaneously to couple each of the one or more shortwave antennas positioned in each of the one or more antenna clusters to the one or more HF transmitters. Alternatively, the common switched cable may be configured simultaneously to couple each of the one or more shortwave antennas positioned in each of the one or more antenna clusters to the one or more HF receivers.

Embodiments of the shortwave antennas may have inputs and outputs connected simultaneously to a transmitter or a receiver by a single common switched cable, thereby removing the need of individually switched antenna selection networks or complex integrated tuning circuits. FIG. 8 is a block diagram 700 illustrating how a shortwave antenna cluster 200 or 300 may be connected to a transceiver unit 714 through passive connectors 702, 704, 706, and 708 without a need of switches or tuning elements, in accordance with example embodiments of the present disclosure. Because the dimension of cables and connectors are a small fraction of a wavelength, all paths in the block diagram 700 may be inherently blocked except the paths leading to each of the antennas in the cluster 200 or 300.

In one embodiment, shortwave antenna 1 and shortwave antenna 2 in cluster 200 or 300 may be connected through a passive connector 702. In one embodiment, shortwave antenna 4 and shortwave antenna 5 in cluster 200 or 300 may be connected through a passive connector 708. In one embodiment, shortwave antenna 3 in cluster 200 or 300 may be connected through a passive connector 704.

Figure 12A:
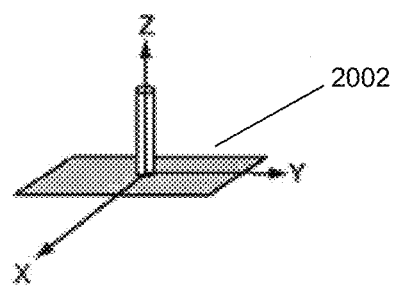
FIG. 12A is a perspective view illustrating an antenna beam of a shortwave antenna comprising an omnidirectional beam according to an embodiment of the present disclosure.
Figure 12B:
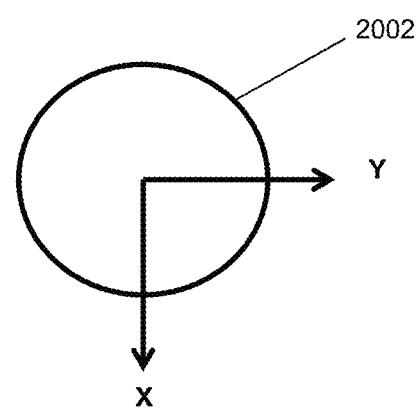
FIG. 12B is a top plan view illustrating an antenna beam of a shortwave antenna comprising an omnidirectional beam according to an embodiment of the present disclosure.

In one disclosed embodiment, each of the plurality of shortwave antennas, positioned in each of the one or more antenna clusters may emit one or more antenna beams 2002 at the one or more HF operating frequencies as illustrated in FIGS. 12A and 12B. As shown in FIG. 12B, the one or more antenna beams, for example, may include a plurality of omnidirectional antenna beams for transmitting and receiving radio signals at the one or more HF operating frequencies in the HF band, thereby allowing the one or more antenna clusters to communicate radio signals at the one or more HF operating frequencies in the HF band. True antenna performance can only be determined by measuring the amount of energy that the antenna radiates into free space. The antenna beams are also called the radiation patterns and they can take various shapes. This can be the most direct measurement of an antenna's actual performance.

According to an embodiment of the present disclosure, a plurality of shortwave antennas in each of the one or more antenna clusters 102 may be positioned on a common platform 110 to form one or more arrangements with pre-selected spacing distance, d between each of the plurality of antennas as illustrated in FIGS. 2A and 2B.

Figure 11:
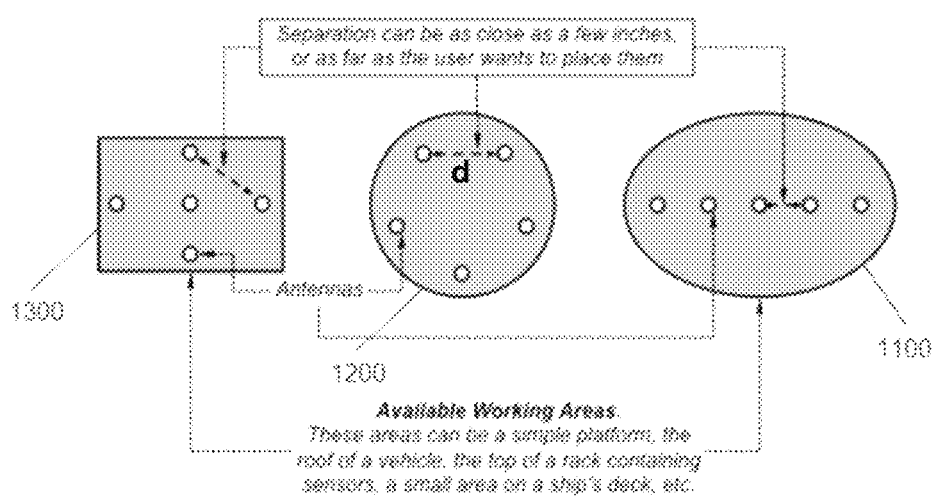
FIG. 11 is a schematic drawing illustrating some of the freedoms that a user has to arrange, group, or position example antennas according to an embodiment of the present disclosure.

The antenna system in the present disclosure may provide flexibility for the user in arranging, grouping, or positioning the shortwave monopole antennas in the cluster 200 or 300, such as shown in FIG. 11, for example. FIG. 11 illustrates three different cluster arrangements 1100, 1200, and 1300 where a separation of antennas may be as close as a few inches, tenths of meters apart, or as far apart, e.g., spaced-apart, as the user may want to place them. According to another embodiment of the present disclosure, the spacing distance, d between each of the antennas in one of the clusters may be a few inches to multiple feet as illustrated in FIG. 11. As shown in FIG. 11, a cluster arrangement 1300 may include a plurality of antennas surrounding an antenna at a center of a cluster. In one embodiment, a cluster arrangement 1400 may include a plurality of antennas arranged in a circle and having a distance d between each antenna and a neighboring antenna. In one embodiment, a cluster 1100 may include a plurality of antennas arranged in series. In one embodiment, the shape of the cluster may be in a form of a rectangle, circle, or oval as shown in FIG. 11.

According to an embodiment of the present disclosure, the signal from one antenna may not couple or interfere with other antennas in the cluster 200 or 300 because each antenna is tuned for one frequency only as assigned by the FCC or ITU. In addition, the presence of one antenna may not affect the efficiency of the other antennas when the frequencies are spread in a typical fashion by the FCC or ITU.

According to another embodiment of the present disclosure, one or more arrangements of a plurality of antennas in one or more clusters can be dimensioned and positioned to reduce couplings and interferences between antennas, thereby ensuring enhanced antenna performance. In addition, each of the plurality of shortwave antennas in each of the one or more antenna clusters may be positioned selectively to rejects adjacent out-of-band transmitted radio signals without the use of filter or complex tuning.

In one embodiment, each of the plurality of the shortwave antennas positioned in each of the one or more antenna clusters may have selected different length dimensions, and substantially similar dielectric core dimensions, and inductances configured to reject radio signals in frequency bands outside of the selected one or more operating frequencies in the HF band.

Figure 10:
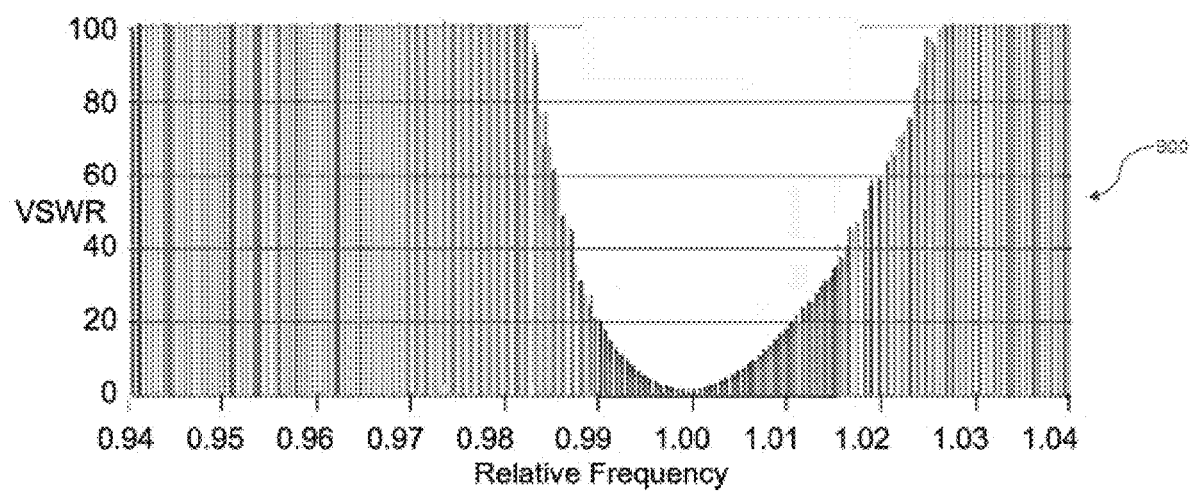
FIG. 10 is a plot of a Voltage Standing Wave Ratio (VSWR) versus Relative Frequency for a typical miniature shortwave radio antenna tuned for any one frequency in the 3 MHz to 30 MHz band (any antenna as in FIG. 8) according to an embodiment of the present disclosure.

According to an embodiment of the present disclosure, performance of an antenna over a particular frequency band may be characterized by a parameter such as the voltage standing wave ratio (VSWR). FIG. 10 illustrates a plot of VSWR 900 for a sample miniature shortwave radio antenna tuned for the frequency band at which it will operate (for example, any antenna as shown in FIG.8). The plot shows that the antenna according to an embodiment may not only accommodate any shortwave signal in its operating band (receive or transmit), but may also effectively exclude transmissions from the neighboring antennas in the cluster 200 or 300. FIG. 10 shows VSWR is minimum for a selected antenna that operates in a corresponding frequency band. Minimum VSWR corresponds to a desirable antenna performance. The smaller the VSWR value, the better the antenna is matched to the transmission line and the more power is delivered to the antenna. Selection of antenna length and structure is generally such as to maximize exclusion (for example 1/100 of a wavelength), although when an array of equal length as in FIG. 4 is desired, some exclusion at higher frequencies may be reduced.

In another disclosed embodiment, each of a plurality of shortwave antennas in each of one or more clusters also may be capable of generating a plurality of omnidirectional beams for each of the assigned frequencies. Further, the plurality of omnidirectional beams may operate to transmit, receive, or both, one or more shortwave radio signals.

Figure 2C:
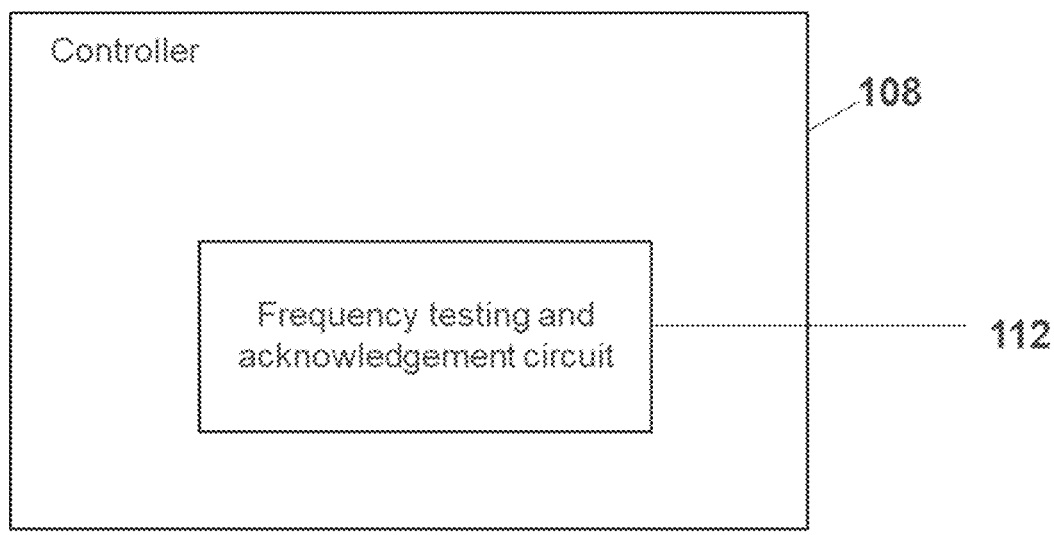
FIG. 2C is a block diagram illustrating the controller of the antenna system includes a frequency testing and acknowledgement circuit according to an embodiment of the present disclosure.

According to an embodiment in the present disclosure, the one or more controllers 108 may include a frequency testing and acknowledgement circuit 112 as illustrated in FIG. 2C. In an embodiment, the frequency testing and acknowledgement circuit 112 may determine and confirm which the one or more HF operating frequencies in the HF band are propagating to and from selected distant locations.

In yet another disclosed embodiment, a miniaturized antenna system for compact multi-band transmission and reception of high-frequency (HF) band may include a plurality of shortwave antennas connected together and arranged in one or more antenna clusters. In addition, the selected length of each of the plurality of the antennas may include a same length dimension as a function of the one or more operating frequencies in the HF band and each of the plurality of the antennas may include a dielectric core dimensions and inductance that are different from one another. Further, the one or more clusters may be positioned to communicate radio signals at the one or more frequencies in a HF band.

In one embodiment, the selected length of each of the plurality of shortwave antennas may be a fraction of a wavelength. The wavelength may be determined by the one or more operating frequencies in the HF band.

In one embodiment, the selected length of each of the plurality of shortwave antennas may be 1/100 of a wavelength.

The length of the shortwave antennas may vary according to the frequency bands as illustrated in FIG. 3. Shown in FIG. 4 is an illustration of another embodiment of a cluster 300 of very small shortwave radio monopole antennas 302, 304, 306, 308, and 310 (about 1/100 of a wavelength at 4 MHz, varying in length to about 1/20 of a wavelength at 20 MHz), in accordance with example embodiments of the present disclosure. Each antenna in the cluster 300 can be configured to operate at a specific frequency so as to provide a multi-band transmission and reception of high-frequency (HF) band. The length of each of the shortwave antennas may be calculated by using Formula (4) as illustrated in a table 600 in FIG. 7. The table 600 may include the wavelength, half-wave, length, and antenna length for each antenna in various frequency bands. The frequency band may include 4 MHz, 7 MHz, 10 MHz, 14 MHz, and 20 MHz. For example, antenna 302 having a multiplier, N of 1/100 can have a length of 14 inches to operate in a frequency band of 4 MHz. As the multiplier, N can be varied for each antenna, the length of each antenna in this embodiment can be maintained the same.

Figure 9:
FIG. 9 is a table illustrating a list of frequencies of a radio signal that will be propagating to a base station on the Earth's surface at particular times of a day stored in internal memory of a transceiver unit according to an embodiment of the present disclosure.

In one embodiment, a transceiver unit 104 shown in FIG. 2A can be connected to the one or more antenna clusters 102 and positioned away from one or more base stations 110 to communicate with the one or more base stations 110. As illustrated in FIG. 9, the transceiver unit 104 may be equipped with an internal memory capable of storing a list of frequencies 800 of a radio signal that will be propagating to a base station 110 on the Earth's surface 50 at particular times of a day. The list of frequencies 800 can include propagating radio signal frequencies (F1, F2, . . . , Fn) and associated times of a day (T1, T2, . . . , Tn) at which the transceiver unit 104 may optimally communicate with the base station 110. The list of the stored frequencies and associated times of a day 800 as illustrated in FIG. 9 may be periodically updated by the base station 110. The combination of the list 800 and the antenna system 100 may enable the transceiver unit 104 to rapidly switch between frequency bands eliminating the time to change antennas or retune an antenna. In this manner, a multi-band transmission and reception of high-frequency (HF) band can be achieved with the embodiments of the antenna system 100 described herein.

According to an embodiment of the present disclosure, the antenna system 100 may allow the transceiver unit 104 to have freedom to rapidly step between bands to acquire a new communication link and receive an acknowledgment when a propagation certainty is unclear and no acknowledgement is received by the one or more transceiver units.

In one embodiment, the one or more transceiver units 104 may have freedom to rapidly step between the plurality of frequency bands to acquire one or more new communication links in an event of unsuccessful propagation of one or more radio signal frequencies to the one or more base stations 110.

Figure 7:
FIG. 7 is a table illustrating the length (L) of each antenna shown in FIG. 4 calculated according to Formula (4) according to an embodiment of the present disclosure.

The length of the shortwave antennas may vary according to the frequency bands as illustrated in FIG. 3. Shown in FIG. 4 is an illustration of another embodiment of a cluster 300 of very small shortwave radio monopole antennas (about 1/100 of a wavelength at 4 MHz, varying in length to about 1/20 of a wavelength at 20 MHz), in accordance with example embodiments of the present disclosure. The length of each of the shortwave antennas may be calculated by using Formula (4) as illustrated in FIG. 7.

Figure 5:
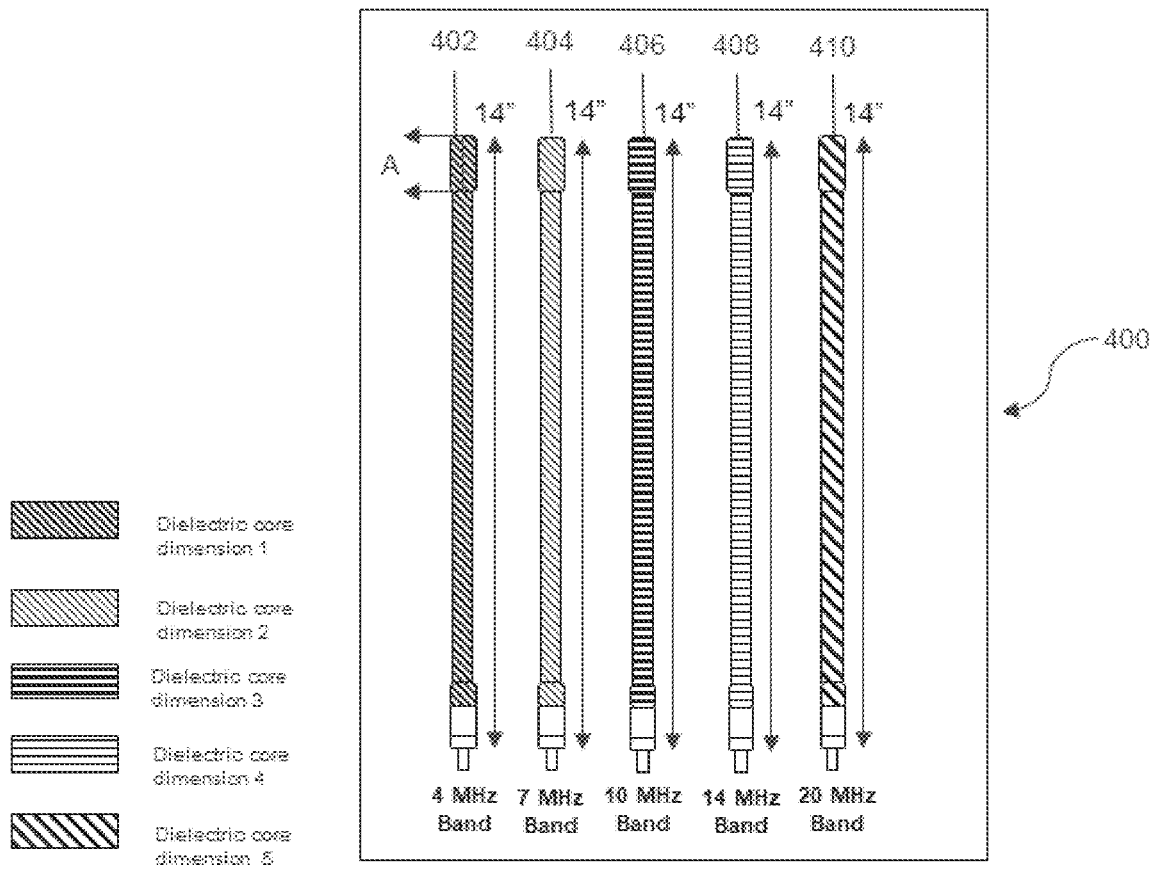
FIG. 5 is a schematic drawing illustrating a cluster of very small shortwave radio monopole antennas (about 1/100 of a wavelength at 4 MHz, varying in length to about 1/20 of a wavelength at 4 MHz) with different dielectric core dimensions and inductive values according to an embodiment of the present disclosure.

According to an embodiment, all frequency bands may have antennas of different, proportional lengths with similar dielectric core dimensions as illustrated in FIG. 3. For example, antenna 202 has a length of 14 inches to operate in a frequency of 4 MHz band. In some embodiments, all frequency bands also may have antennas 402, 404, 406, 408, 410 of the same length but different dielectric core dimensions as illustrated in FIG. 5. As shown in FIG. 5, antenna 402 may have dielectric core dimension 1, antenna 404 may have dielectric core dimension 2, antenna 406 may have dielectric core dimension 3, antenna 408 may have dielectric core dimension, and antenna 410 may have dielectric core dimension 5.

Figure 13:
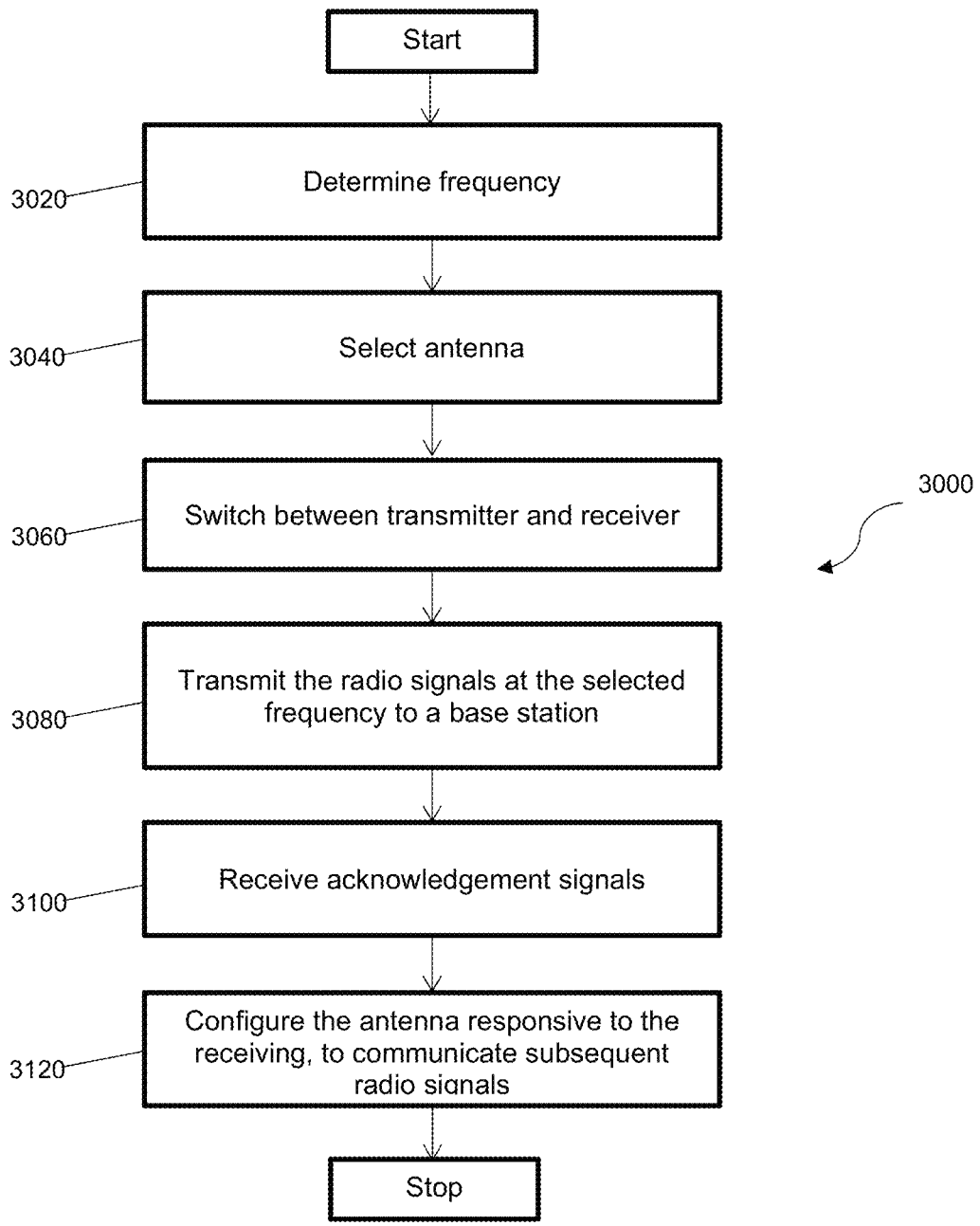
FIG. 13 is a flow diagram of a method for operating a compact multi-band high-frequency (HF) antenna system for connection with one or more distant base stations, according to a disclosed embodiment.

FIG. 13 is a method 3000 to operate a compact multi-band high-frequency (HF) antenna system for connection with one or more distant base stations 110 at selected distant locations. For purposes of illustration, an embodiment of a plurality of a method 3000 depicted in FIG. 13 may be implemented using the antenna system 100.

Figure 14:
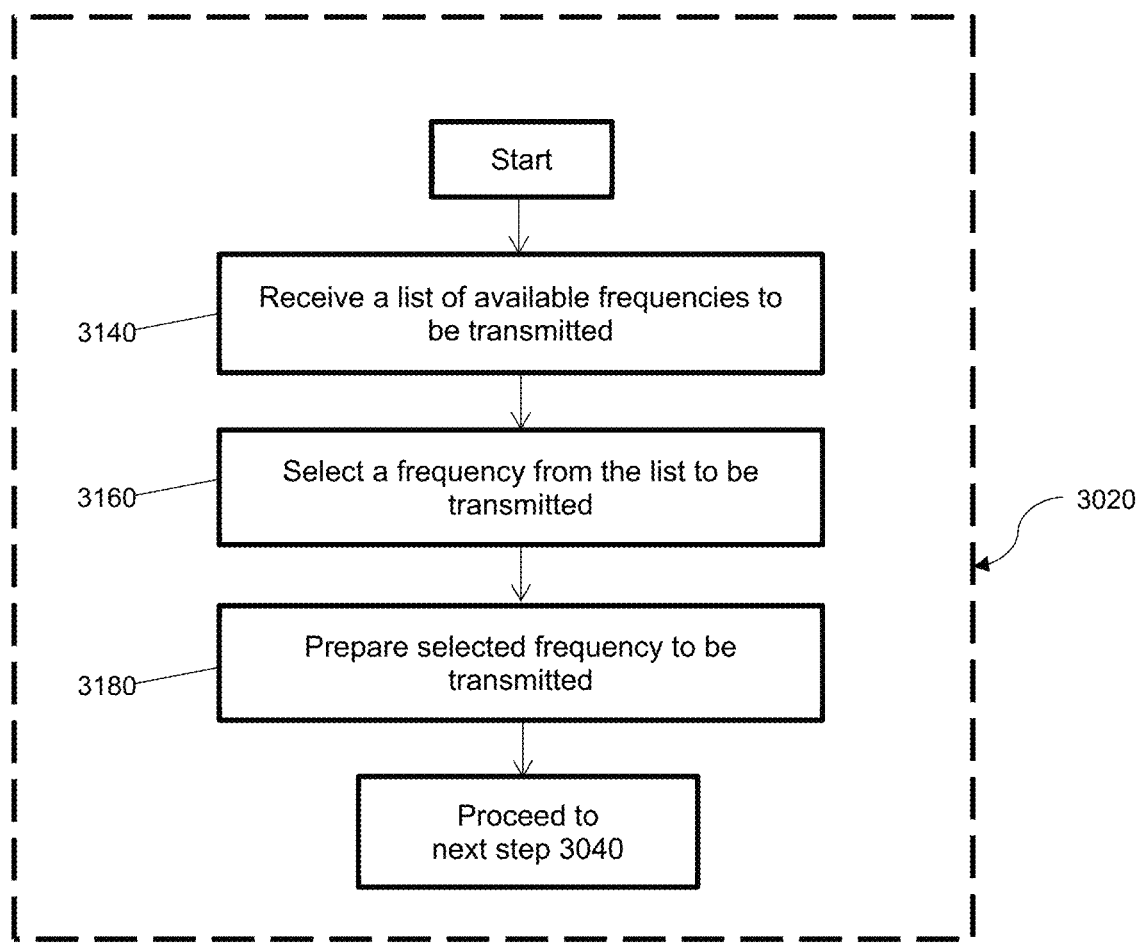
FIG. 14 is a flow diagram of a method for determining one or more selected frequencies of the radio signals in the HF band to be transmitted by one or more shortwave antenna controllers, according to a disclosed embodiment.

In one embodiment, the method 3000 may begin at step 3020 by determining one or more selected frequencies of the radio signals in the HF band to be transmitted by one or more shortwave antenna controllers 108. According to an embodiment, step 3020 may include receiving 3140, by the transceiver unit, a list of available frequencies in the HF band on which the radio signals can be transmitted on as illustrated in FIG. 14. Step 3020 may proceed to selecting 3160 a frequency from the list of available frequencies for a transmission of the radio signals to the one or more distant base stations 110 at selected distant locations. Step 3020 then may proceed to preparing the selected available frequency in the HF band to indicate it is ready for the transmission of the radio signals to the one or more distant base stations 110 at selected distant locations at step 3180.

The method 3000 may continue with selecting one or more shortwave antennas from a plurality of shortwave antennas at step 3040. In one embodiment, each shortwave antenna may have selected lengths, dielectric core dimensions, and inductances. Each of the one or more shortwave antennas may also be tuned to one or more operating frequencies in the HF band. Each of the selected one or more shortwave antennas may be positioned to emit one or more antenna beams to communicate radio signals at the one or more operating frequencies in the HF band.

Figure 15:
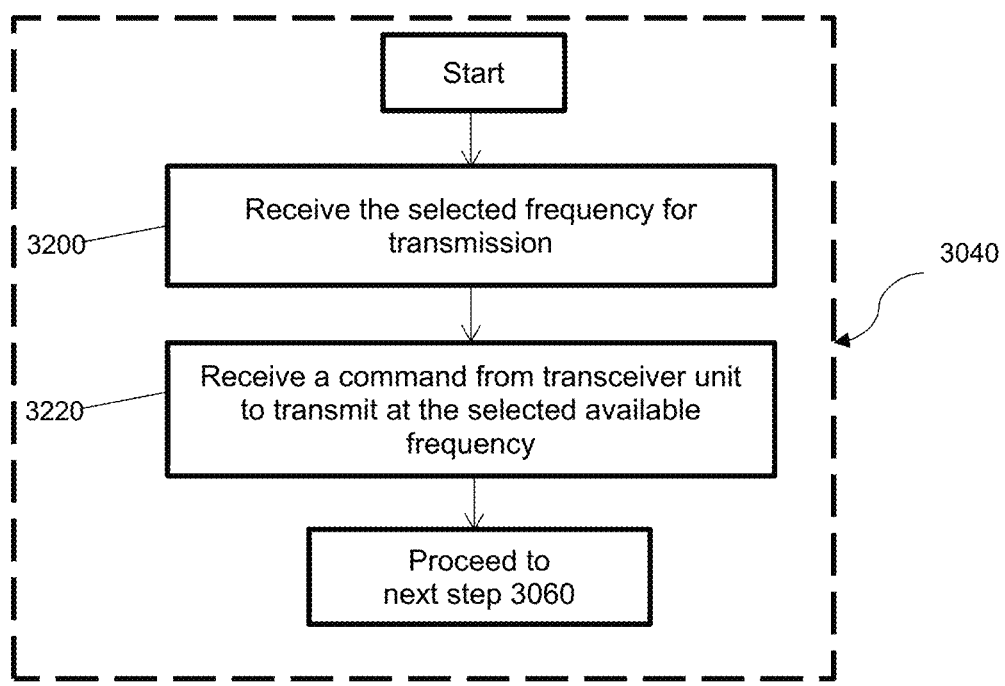
FIG. 15 is a flow diagram of a method for selecting one or more shortwave antennas from a plurality of shortwave antennas, according to a disclosed embodiment.

As shown in FIG. 15, step 3040 may include receiving 3200, by one or more shortwave antenna controllers 108, the selected available frequency in the HF band for the transmission of the radio signals to the one or more distant base stations 110 at selected distant locations. Further, step 3040 may proceed to receiving 3220, by the one or more shortwave antenna controllers 108, a command from the transceiver unit to allocate and transmit the radio signals at the selected available frequency in the HF band to the one or more distant base stations 110 at selected distant locations.

In some embodiments, a remote fixed, land mobile, or shipboard transceiver unit may be operable to communicate with a plurality of base stations 110 at selected distant locations. Each of the plurality of the base stations 110 may require a specific frequency in the HF band to communicate with the transceiver unit. The one or more shortwave antennas from a plurality of shortwave antennas in one or more antenna clusters may allow the transceiver unit to instantly select available frequency for the transmission of the radio signals without requiring switching elements or tuning circuitry.

After selecting the one or more shortwave antennas from the plurality of shortwave antennas at step 3040, the method 3000 may proceed with selectively switching between one or more HF transmitters and one or more HF receivers at step 3060. The antenna system may be positioned in transmit mode when the one or more shortwave antennas are connected to the one or more HF transmitters. Alternatively, the antenna system may be positioned in receive mode when the one or more shortwave antennas are connected to the one or more HF receivers.

After the switching between the one or more HF transmitters and the one or more HF receivers at step 3060, the method 3000 may continue at step 3080 with transmitting the radio signals at the one or more selected frequencies in the HF band through the one or more selected shortwave antennas to the one or more distant base stations 110 at the selected distant locations.

Figure 16:
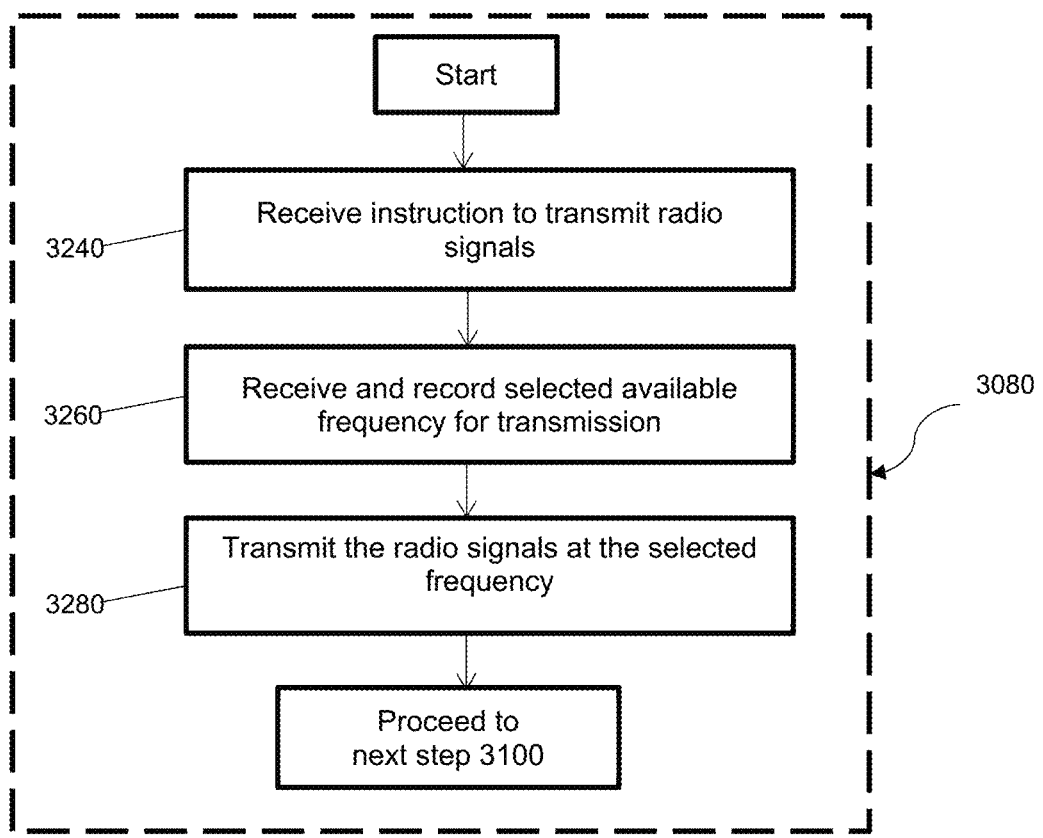
FIG. 16 is a flow diagram of a method for transmitting the radio signals at the one or more selected frequencies in the HF band through the one or more selected shortwave antennas to the one or more distant base stations at the selected distant locations, according to a disclosed embodiment.

As illustrated in FIG. 16, an embodiment of step 3080 may begin with receiving 3240, by the transceiver unit, instructions to transmit the radio signals. After step 3240, step 3080 may proceed to receiving and recording 3260, by the transceiver unit, the selected available frequency for the transmission of the radio signals to the one or more distant base stations 110 at the selected distant locations. Step 3080 may proceed to transmitting 3280 the radio signals at the selected available frequency to the one or more distant base stations 110 at the selected distant locations.

Figure 17:
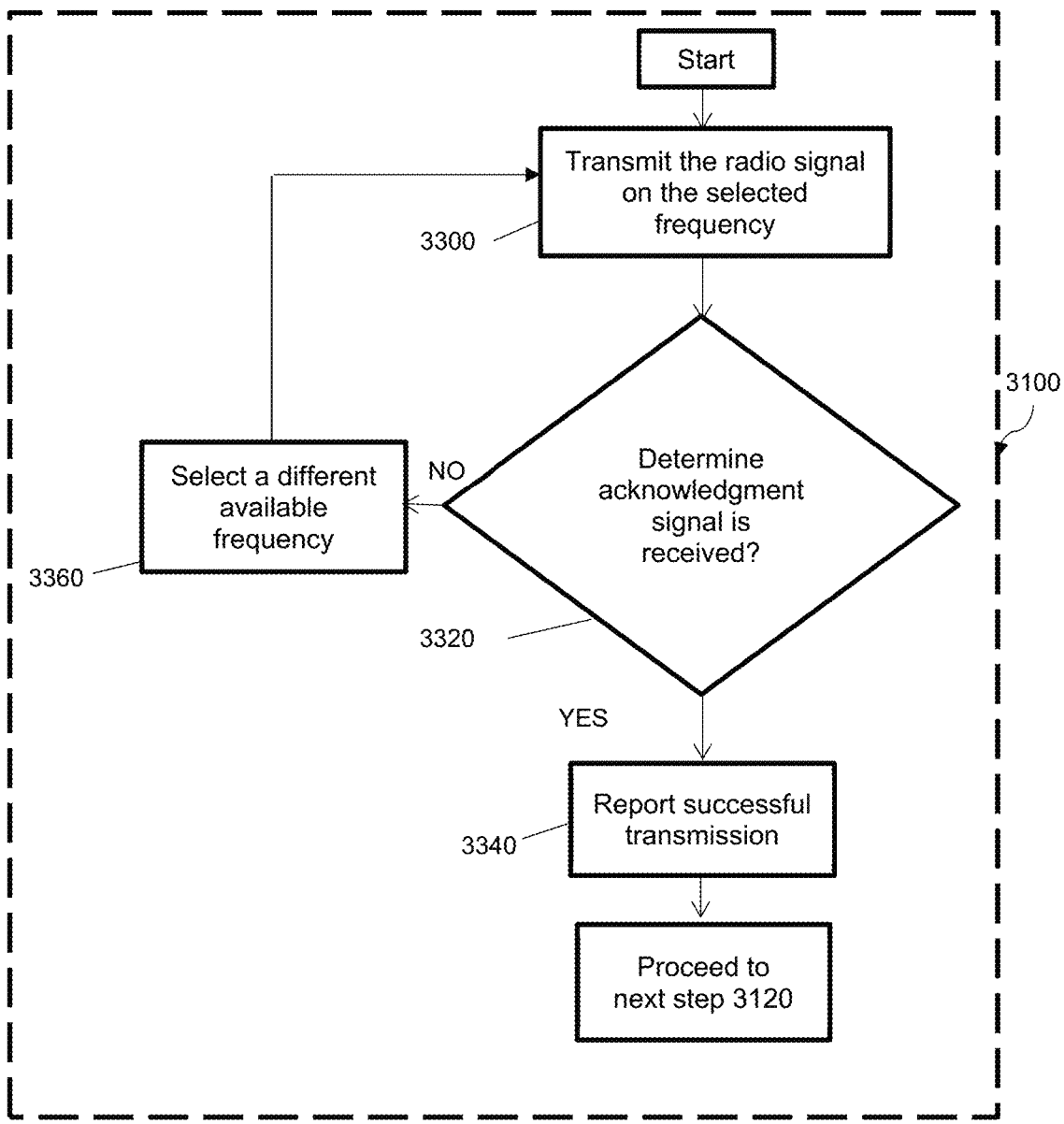
FIG. 17 is a flow diagram for determining if one or more acknowledgement signals are received from the one or more distant base stations at the selected distant locations within a selected range of time after transmitting the radio signals at the available frequency in the HF band, according to a disclosed embodiment.

As shown in FIG. 13, the method 3000 may further include receiving one or more acknowledgement signals, by the one or more shortwave antenna controllers, to indicate a successful transmission of the transmitted radio signals at step 3100. FIG. 17 illustrates step 3100 may begin with transmitting 3300 the radio signals at the selected available frequency to the one or more distant base stations 110 at the selected distant locations.

Step 3100 may proceed to a conditional check 3320 for determining, by the one or more shortwave antenna controllers 108, if one or more acknowledgement signals are received from the one or more distant base stations 110 at the selected distant locations within a selected range of time after transmitting the radio signals at the selected available frequency in the HF band. If the one or more shortwave antenna controllers 108 receive the one or more acknowledgement signals within the selected range of time after transmitting the radio signals at the selected available frequency in the HF band, step 3100 may proceed to 3340. Step 3340 may include reporting, by the one or more shortwave antenna controllers 108, a successful transmission of the transmitted radio signals at the selected available frequency in the HF band to the one or more distant base stations 110 at the selected distant locations. After step 3340, step 3100 may proceed to step 3120. If the one or more shortwave antenna controllers 108 do not receive the acknowledgment signals from the one or more distant base stations 110 at the selected distant locations within the selected range of time after transmitting the radio signals at the available frequency in the HF band, step 3100 may proceed to 3360. Step 3360 may include selecting, by the transceiver unit, another available frequency from the list of available frequencies for the transmission of the radio signals to the one or more distant base stations 110 at selected distant locations. Step 3100 may proceed to 3300 for transmitting the radio signals at the newly selected available frequency in the HF band to the one or more distant base stations 110 at selected distant locations.

After the one or more shortwave antenna controllers 108 receive the acknowledgement signal at step 3100, the method 3000 may proceed to step 3120 with the antenna system configuring the antenna to communicate subsequent radio signals.

The present application is a non-provisional application which claims priority to, and the benefit of U.S. Provisional Application No. 62/791,071, titled "MINIATURIZED SHORTWAVE ANTENNA CLUSTER SYSTEM FOR COMPACT MULTI-BAND TRANSMISSION AND RECEPTION AND ASSOCIATED METHODS," filed Jan. 11, 2019, which is incorporated herein by reference in its entirety.

It should be understood that the order of activity as depicted in the figures above are conceptual and may deviate without departing from the various embodiments disclosed. Moreover, the specification and drawings are, accordingly, to be regarded in an illustrative rather than a restrictive sense. It will, however, be evident that various modifications and changes may be made thereunto without departing from the broader spirit and scope of the disclosure. While different embodiments of the disclosure, including apparatuses, systems, and methods, have been shown or described in only some of its forms, it should be apparent to those skilled in the art that the disclosure is not so limited, but is susceptible to various changes without departing from the scope of the disclosure. Furthermore, it is to be understood that the above disclosed embodiments are merely illustrative of the principles and applications of the present disclosure. Accordingly, numerous modifications may be made to the illustrative embodiments and other arrangements may be devised without departing from the spirit and scope of the present disclosure.

The invention claimed is:

1. A miniaturized antenna system for compact multi-band transmission and reception of high frequency (HF) band, the system comprising:
   a plurality of shortwave antennas positioned and arranged in one or more antenna clusters, each of the plurality of the shortwave antennas having a different length dimension as a function of one or more HF operating frequencies in a HF band and substantially similar dielectric core dimensions, the one or more antenna clusters also being positioned to communicate radio signals at the one or more HF operating frequencies in the HF band;
   a common platform connected to the one or more antenna clusters, the plurality of shortwave antennas being positioned spaced apart from each of the other ones of the plurality of shortwave antennas thereby to form one or more selected antenna cluster arrangements on the common platform;
   one or more shortwave antenna controllers connected to the one or more antenna clusters to selectively control the one or more antenna clusters when connected to either one or more HF transmitters, one or more HF receivers, or both; and
   one or more monitors responsive to the one or more shortwave antenna controllers to monitor operational characteristics of the one or more antenna clusters.

2. The system as defined in claim 1, wherein the different length dimension of each of the plurality of the shortwave antennas is a fraction of a wavelength of a selected HF operating frequency of the one or more HF operating frequencies.

3. The system as defined in claim 1, wherein each of the plurality of shortwave antennas, positioned in each of the one or more antenna clusters, is also connected to the one or more HF transmitters or the one or more HF receivers via a common switched cable, wherein the common switched cable is configured simultaneously to couple each of the one or more shortwave antennas positioned in each of the one or more antenna clusters to the one or more HF transmitters or simultaneously to couple each of the one or more shortwave antennas positioned in each of the one or more antenna clusters to the one or more HF receivers.

4. The system as defined in claim 1, wherein each of the plurality of shortwave antennas, positioned in each of the one or more antenna clusters emit one or more antenna beams at the one or more HF operating frequencies, wherein the one or more antenna beams comprise a plurality of omnidirectional antenna beams for transmitting and receiving radio signals at the one or more HF operating frequencies in the HF band, thereby allowing the one or more antenna clusters to communicate radio signals at the one or more HF operating frequencies in the HF band.

5. The system as defined in claim 1, wherein each of the plurality of shortwave antennas, positioned in each of the one or more antenna cluster transmits the radio signals at the one or more selected frequencies in the HF band to one or more distant base stations at selected distant locations without use of a separate power source.

6. The system as defined in claim 5, wherein each of the plurality of the shortwave antennas positioned in each of the one or more antenna clusters has selected different length dimensions, and substantially similar dielectric core dimensions, and inductances configured to reject radio signals in frequency bands outside of the selected one or more operating frequencies in the HF band.

7. The system as defined in claim 6, wherein the one or more shortwave antenna controllers connected to the one or more antenna clusters comprise:
   a frequency testing and acknowledgement circuit, wherein the frequency testing and acknowledgement circuit is configured to determine and confirm which the one or more HF operating frequencies in the HF band are propagating to and from selected distant locations.

8. A miniaturized antenna system for compact multi-band transmission and reception of high frequency (HF) band, the system comprising:
   a plurality of shortwave antennas positioned and arranged in one or more antenna clusters, each of the plurality of the shortwave antennas having a same length dimension proportional to each of one or more HF operating frequencies in a HF band and substantially different dielectric core dimensions, the one or more antenna clusters also being positioned to communicate radio signals at the one or more HF operating frequencies in the HF band;
   a common platform connected to the one or more antenna clusters, the plurality of shortwave antennas being positioned spaced apart from each of the other ones of the plurality of shortwave antennas thereby to form one or more selected antenna cluster arrangements on the common platform;

one or more shortwave antenna controllers connected to the one or more antenna clusters to selectively control the one or more antenna clusters when connected to either one or more HF transmitters, one or more HF receivers, or both; and one or more monitors responsive to the one or more shortwave antenna controllers to monitor operational characteristics of the one or more antenna clusters.

9. The system as defined in claim 8, wherein the different length dimension of each of the plurality of the shortwave antennas is a fraction of a wavelength of a selected HF operating frequency of the one or more HF operating frequencies.

10. The system as defined in claim 8, wherein each of the plurality of shortwave antennas, positioned in each of the one or more antenna clusters, is also connected to the one or more HF transmitters or the one or more HF receivers via a common switched cable, wherein the common switched cable is configured simultaneously to couple each of the one or more shortwave antennas positioned in each of the one or more antenna clusters to the one or more HF transmitters or simultaneously to couple each of the one or more shortwave antennas positioned in each of the one or more antenna clusters to the one or more HF receivers.

11. The system as defined in claim 8, wherein each of the plurality of the shortwave antennas positioned in each of the one or more antenna clusters has selected same length dimensions, substantially different dielectric core dimensions, and inductances configured to reject radio signals in frequency bands outside of the selected one or more operating frequencies in the HF band.

12. The system as defined in claim 11 further comprising:
one or more transceiver units connected to the one or more antenna clusters and positioned away from one or more base stations to communicate with the one or more base stations, wherein the one or more transceiver units have internal memory to store one or more pairs of propagating radio signal frequencies and associated times of a day, thereby allowing the one or more transceiver units to rapidly switch between a plurality of frequency bands and eliminating the time to change the one or more shortwave antennas or retune the one or more shortwave antennas.

13. The system as defined in claim 12, wherein the one or more pairs of propagating radio signal frequencies and associated times of a day are periodically updated by the one or more base stations.

14. The system as defined in claim 13, wherein the one or more transceiver units have freedom to rapidly step between the plurality of frequency bands to acquire:
(i) one or more new communication links in an event of unsuccessful propagation of one or more radio signal frequencies to the one or more base stations; and
(ii) a new communication link in an event of one or more acknowledgements are not received by the one or more transceiver units.

15. A method of operating a compact multi-band high frequency (HF) antenna system for connection with one or more distant base stations, the antenna system comprising a plurality of shortwave antennas disposed on a common platform configurable for transmission and reception of radio signals in HF band and also supports communications in multiple frequency bands in the HF band, the method comprising:
determining, by one or more shortwave antenna controllers, one or more selected frequencies of the radio signals to be transmitted;
selecting one or more shortwave antennas from the plurality of shortwave antennas, each shortwave antenna has selected lengths, dielectric core dimensions, and inductances, each of the one or more shortwave antennas also tuned to one or more operating frequencies in the HF band, each of the selected one or more shortwave antennas positioned to emit one or more antenna beams to communicate radio signals at the one or more operating frequencies in the HF band; and
selectively switching between one or more HF transmitters and one or more HF receivers, the antenna system positioned in transmit mode when the one or more shortwave antennas are connected to the one or more HF transmitters, and the antenna system positioned in receive mode when the one or more shortwave antennas are connected to the one or more HF receivers.

16. The method as defined in claim 15, further comprising:
transmitting the radio signals at the one or more selected frequencies in the HF band through the one or more selected shortwave antennas to the one or more distant base stations at selected distant locations;
receiving one or more acknowledgement signals, by the one or more shortwave antenna controllers, to indicate a successful transmission of the transmitted radio signals; and
configuring the antenna, responsive to the receiving, to communicate subsequent radio signals.

17. The method as defined in claim 15, wherein the selected length of each of the plurality of shortwave antennas comprises a different length dimension as a function of the one or more operating frequencies in the HF band and substantially similar dielectric core dimensions.

18. The method as defined in claim 15, wherein the selected length of each of the plurality of shortwave antennas comprises a same length dimension as a function of the one or more operating frequencies in the HF band and substantially different dielectric core dimensions.

19. The method as defined in claim 15, wherein the selected length of each of the plurality of shortwave antennas is a fraction of a wavelength, the wavelength being determined by the one or more operating frequencies in the HF band.

20. The method as defined in claim 18, wherein the selected length of each of the plurality of shortwave antennas is 1/100 of a wavelength, the wavelength being determined by the one or more operating frequencies in the HF band.

* * * * *